United States Patent
Liu

(10) Patent No.: US 12,219,629 B2
(45) Date of Patent: Feb. 4, 2025

(54) SYSTEM AND METHOD FOR PROCESSING DATA BASED ON EDGE COMPUTING OF TERMINAL AND SIDELINK BETWEEN TERMINALS

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 413 days.

(21) Appl. No.: 17/733,953

(22) Filed: Apr. 29, 2022

(65) Prior Publication Data

US 2022/0264675 A1 Aug. 18, 2022

Related U.S. Application Data

(63) Continuation of application No. PCT/CN2019/115815, filed on Nov. 5, 2019.

(51) Int. Cl.
- *H04W 4/00* (2018.01)
- *H04W 24/10* (2009.01)
- *H04W 76/14* (2018.01)

(52) U.S. Cl.
CPC .......... *H04W 76/14* (2018.02); *H04W 24/10* (2013.01)

(58) Field of Classification Search
CPC .................................................. H04W 76/14
See application file for complete search history.

(56) References Cited

U.S. PATENT DOCUMENTS 10,110,495 B1 10/2018 Sabella et al.
2022/0131908 A1* 4/2022 yman .................. H04L 65/1073
(Continued)

FOREIGN PATENT DOCUMENTS

CN 108496341 A 9/2018
CN 109040298 A 12/2018
(Continued)

OTHER PUBLICATIONS

INAO issued in Application No. 202247031953, dated Oct. 19, 2022,with English translation,(7p).
(Continued)

*Primary Examiner* — Elisabeth Benoit Magloire
(74) *Attorney, Agent, or Firm* — Arch & Lake LLP; Hao Tan; Shen Wang

(57) ABSTRACT

A system for processing data includes a terminal and a lower-layer terminal device. The terminal is provided with a first edge computing processor for implementing an edge computing function of the terminal, and the terminal supports a 5G-based relay communication technology from the terminal to the network. 5G communication connection is supported by the terminal and the lower-layer terminal device. A Sidelink connection is established between the terminal and the lower-layer terminal device. The lower-layer terminal device is configured to send a data processing request to the terminal through the Sidelink connection. The terminal is configured to receive and process the data processing request through the first edge computing processor to obtain a processed result; and send the processed result through the Sidelink connection to the lower-layer terminal device. The lower-layer terminal device is configured to receive the processed result through the Sidelink connection.

13 Claims, 8 Drawing Sheets

(56) References Cited

U.S. PATENT DOCUMENTS

2022/0191962 A1* 6/2022 Di Girolamo ........ H04W 76/14
2024/0008077 A1* 1/2024 Han .................. H04W 74/0816

FOREIGN PATENT DOCUMENTS

| CN | 109587664 A | 4/2019 | | |
|---|---|---|---|---|
| CN | 109815733 A | 5/2019 | | |
| CN | 109816815 A | 5/2019 | | |
| DE | 112016002652 T5 * | 3/2018 | ............. | H04L 67/10 |
| WO | 2018176264 A1 | 10/2018 | | |

OTHER PUBLICATIONS

Extended European Search Report issued in Application No. 19951603.0, dated Oct. 10, 2022, (32p).
Yang Li, et al., "Communication and Computation Cooperation in Wireless Network for Mobile Edge Computing", IEEE Access, Digital Object Identifier 10.1109/ACCESS.2019.2933037, (15p).
Shirvastava et al., "Joint Optimization of Energy Efficiency and Scheduling Strategies for Side-link Relay System", 978-1-5090-4183-1/17, 2017 IEEE, (6p).
International Search Report of PCT/CN2019/115815 dated Jul. 24, 2020 with English translation, (4p).

* cited by examiner

SYSTEM AND METHOD FOR PROCESSING DATA BASED ON EDGE COMPUTING OF TERMINAL AND SIDELINK BETWEEN TERMINALS

CROSS-REFERENCE TO RELATED APPLICATION

This application is a continuation application of International Application No. PCT/CN2019/115815, filed on Nov. 5, 2019, the entire disclosure of which is incorporated herein by reference for all purposes.

TECHNICAL FIELD

The disclosure relates to the field of mobile communications, and in particular to a system for processing data, a method for processing data, an apparatus for processing data and a device for processing data, and a readable storage medium.

BACKGROUND

With the development of communication technology and the sharp increase in the variety and quantity of terminal devices including wearable devices, the amount of computation required by a central server increases and the workload of an access network device increases gradually. To this end, by a method where edge nodes are set in the access network device and the computing requirements from a certain type of devices are centrally processed in the edge nodes, the calculation amount of the central server is reduced, thus reducing the loads of the central server.

However, the way in which the edge computing node is set in a unit of access network device still does not have a high integration degree, and the communication requirements for the access network device are still relatively high. When hardware conditions of the access network devices cannot meet the communication requirements, the efficiency of edge computing nodes is relatively low, which in turn leads to low efficiency of processing data by the devices.

SUMMARY

In a first aspect of the disclosure, a system for processing data is provided. The system for processing data includes: a terminal and a lower-layer terminal device. The terminal is provided with a first edge computing processor. The first edge computing processor is configured to implement an edge computing function of the terminal, and the terminal supports a 5G-based relay communication technology from the terminal to the network. 5G communication connection is supported by both the terminal and the lower-layer terminal device, and a Sidelink connection is established between the terminal and the lower-layer terminal device. The lower-layer terminal device is configured to send a data processing request to the terminal through the Sidelink connection. The terminal is configured to receive the data processing request; process the data processing request through the first edge computing processor to obtain a first processed result; and send the processed result through the Sidelink connection to the lower-layer terminal device. The lower-layer terminal device is configured to receive the first processed result through the Sidelink connection.

In a second aspect of the disclosure, a method for processing data is provided. The method is performed by a terminal. The terminal is provided with a first edge computing processor. The first edge computing processor is configured to implement an edge computing function of the terminal. The terminal supports a 5G-based relay communication technology from the terminal to the network and 5G communication connection. The method includes: receiving a data processing request sent by a lower-layer terminal device through a Sidelink connection; processing the data processing request by the first edge computing processor to obtain a first processed result; and sending the first processed result to the lower-layer terminal device through the Sidelink connection.

In a third aspect of the disclosure, a method for processing data is performed by a lower-layer terminal device. A Sidelink connection is established between the lower-layer terminal device and a terminal. The lower-layer terminal device supports 5G communication connection. The method includes: sending a data processing request to the terminal through the Sidelink connection; and receiving a first processed result sent by the terminal through the Sidelink connection, in which the first processed result is obtained by the terminal through a first edge computing processor, and the first edge computing processor is configured to implement an edge computing function of the terminal.

BRIEF DESCRIPTION OF THE DRAWINGS

In order to illustrate the technical solutions in the embodiments of the present disclosure more clearly, the following briefly introduces the accompanying drawings used in the description of the embodiments. Obviously, the accompanying drawings in the following description are some embodiments of the present disclosure. For those skilled in the art, other drawings may also be obtained from these drawings without creative efforts.

DETAILED DESCRIPTION

Embodiments may be described in detail herein, examples of which are illustrated in the accompanying drawings. Where the following description refers to the drawings, the same numerals in different drawings refer to the same or similar elements unless otherwise indicated. The implementations described in the embodiments below are not intended to represent all implementations consistent with this disclosure. Rather, they are examples of apparatuses and methods consistent with some aspects of the present disclosure as recited in the appended claims.

First, the terms involved in the embodiments of the present disclosure are briefly introduced.

Sidelink is an important branch of cellular Internet of Things (IoT) technology, i.e., Device to Device Communication. The Sidelink may satisfy the Sidelink between two user equipment (UEs). The Sidelink achieves addressing through a source identifier and a target identifier of the Media Access Control (MAC) layer. Before transmission, pre-connection between UEs is not needed, thus the Sidelink provides a faster and more efficient connection method between the UEs.

Edge computing refers to a distributed open platform that integrates network, computing, storage, and application core capabilities where edge nodes are set close to the network edge side of the terminal or data source, as a computing technology that provides edge intelligent services nearby. Optionally, the network edge refers to a server located at the edge of the network and corresponding hardware devices, which are different from the central server of a network and corresponding hardware devices. In an example, when the data sent by the UE is processed at the network edge node, the corresponding time may be faster than that at the central server of the network since the edge node of the network has a smaller task load, is closer to the UE and the communication effect is better. Optionally, in the related art, the network edge may be implemented as a base station (such as, gNodeB, gNB).

Relay, the concept of which in wireless communication refers to allowing a large number of users to share a relatively small number of signals in a cell, that is, channels may be allocated as needed to each user from a channel library. In network communication, the role of a network switch may also be called a relay. That is, a device connected to the switch is enabled to obtain high-quality network signals and perform network connection in a higher quality with the corresponding network through the hardware design of the switch.

Figure 1:
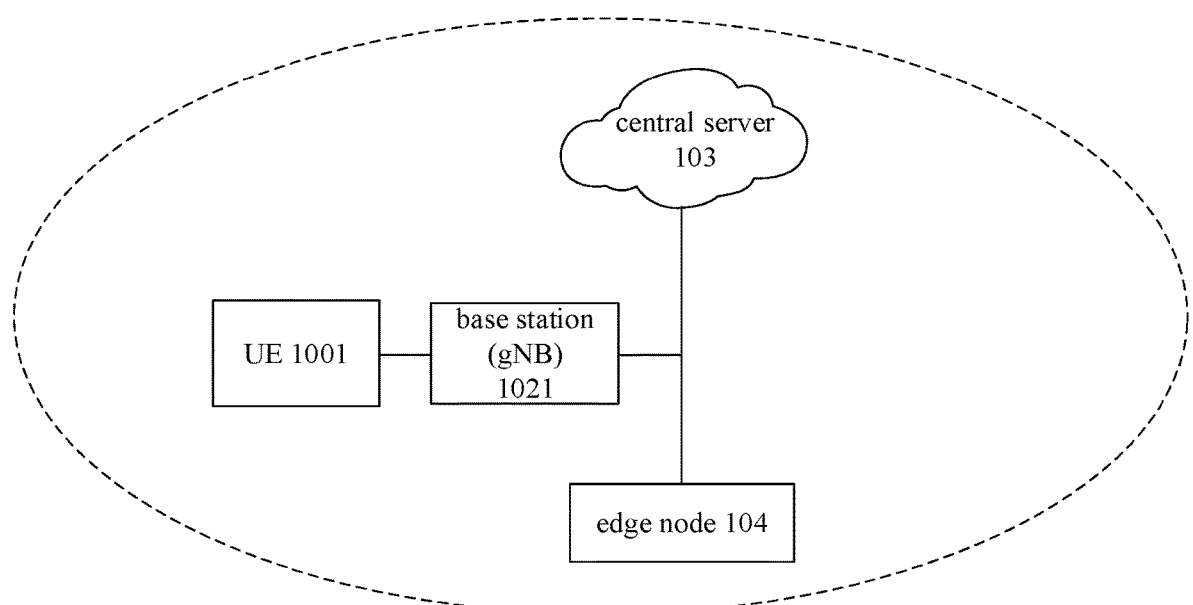
FIG. 1 illustrates a block diagram of a communication system.

FIG. 1 illustrates a block diagram of a communication system. As illustrated in FIG. 1, when the gNB has edge computing capability, the UE is connected to the gNB. Optionally, during the communication process with the gNB, the UE sends a data processing request to the gNB that needs the gNB for processing and sending a processed result. Optionally, the data processing request includes a request for data calculation or a request for sending data stored in the cloud server. Optionally, after receiving the above data processing request, the gNB may perform data processing directly through an edge network node 104 corresponding to the gNB that is set near the gNB by a central server 103, rather than to further send the request to the central server 103 for data processing. Optionally, when the data processing request sent by the UE to the gNB is one that may be processed by the edge node 104, the edge node 104 may directly process the data and send the processed result to the UE. Optionally, when the data processing request sent by the UE to the gNB is one that cannot be processed by the edge node 104, the gNB may send the data to the central server 103 for processing. It may be seen that, the role of the edge node 104 is to solve a part of data processing requests from the UE within a scope of its own computing capability and storage resource capability, so as to improve the communication efficiency between the UE and the gNB.

Figure 2:
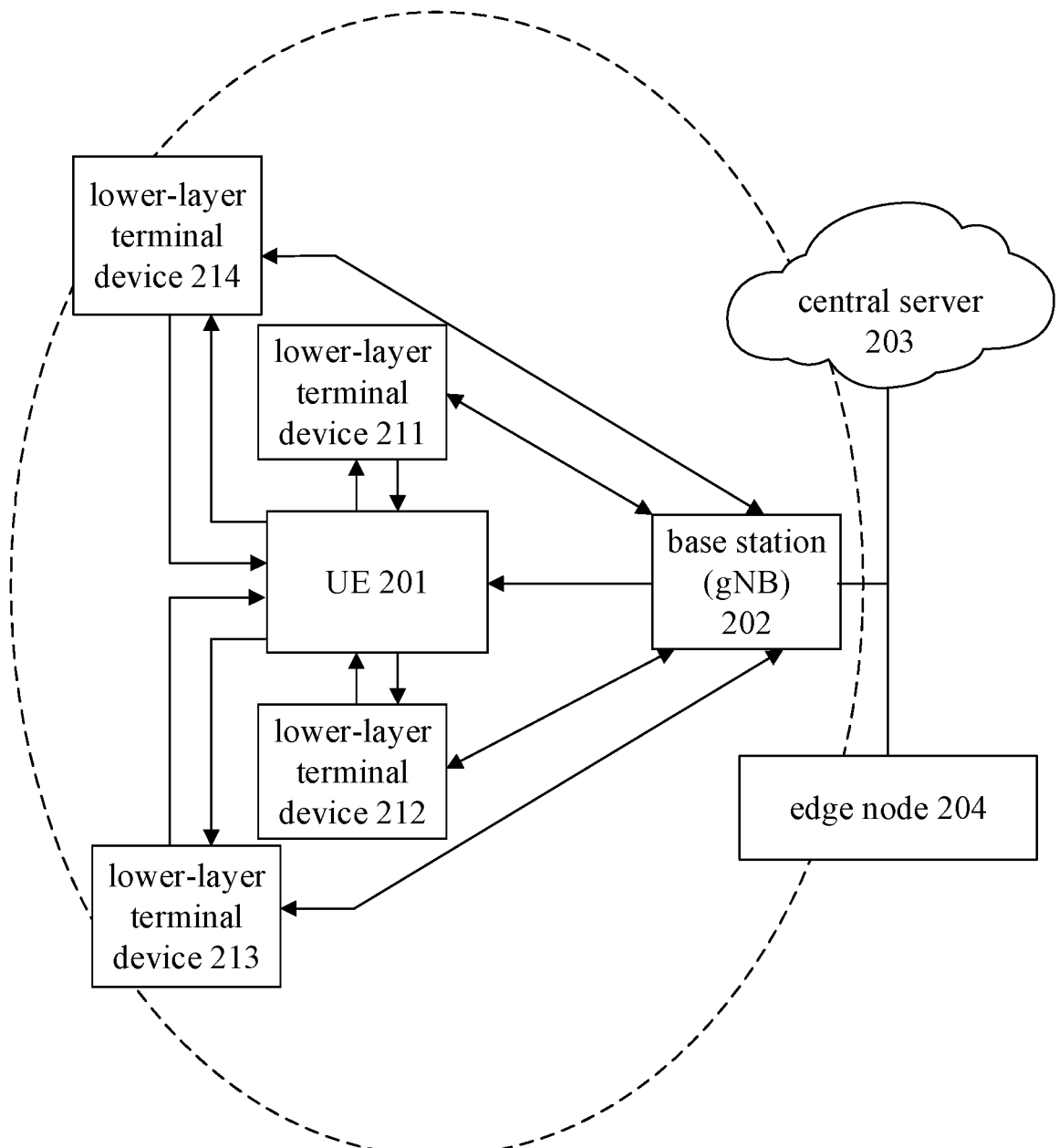
FIG. 2 illustrates a block diagram of another communication system.

FIG. 2 illustrates a block diagram of another communication system. As illustrated in FIG. 2, in addition to a user terminal 201, the communication system also includes four lower-layer terminal devices: a lower-layer terminal device 211, a lower-layer terminal device 212, a lower-layer terminal device 213 and a lower-layer terminal device 214. Optionally, the lower-layer terminal device refers to a device that may be connected to the terminal. Optionally, the lower-layer terminal device also has the ability to connect with the base station. Optionally, the lower-layer terminal device may be a wearable device. The wearable device refers to a portable device that may be worn directly on the body or integrated into daily furnishings of users. The wearable device may realize a data transmission function through software support, data interaction and cloud interaction. The mainstream forms of wearable devices include: Watches (including watches, wristbands and other products) supported by the wrist, Shoes (including shoes, socks and other products worn on the legs) supported by the feet, Glass (including glasses, helmets, headbands and other products placed on the head) supported by the head, and other non-mainstream products.

Optionally, the connection between the lower-layer terminal device and the gNB includes a wireless fidelity network (WiFi) connection and a cellular mobile network connection. The lower-layer terminal device realizes the communication with the gNB through the connection with the gNB. Optionally, in the communication process with the gNB and its own working process, the lower-layer terminal device may also send a data processing request to the gNB when the data processing is needed. When the data processing request is received by the gNB, the data may be processed by the edge node or central server and the processed result may be sent back to the lower-layer terminal device.

Optionally, the connection between the lower-layer terminal device and the UE includes a Near Field Communication (NFC) or Bluetooth connection. In a possible example, the lower-layer terminal device 211 to the lower-layer terminal device 214 are all connected to the UE through a Bluetooth connection, and data transmission may also be performed among the lower-layer terminal device 211 to the lower-layer terminal device 214 and the UE. The lower-layer terminal device 211 is taken as an example. In an example, the lower-layer terminal device 211 transmits a data processing request to the UE by means of the Bluetooth transmission. After the UE receives the data processing request, the UE performs format processing on the data processing request and sends the processed request to the gNB through a protocol with the gNB. When the gNB receives the processed data processing request, the data may be processed through the edge node or the central server and the processed result is sent to the UE. The UE performs format processing the processed result and sends back to the lower-layer terminal device 211.

Optionally, in the above communication system, excessive communication function of the lower-layer terminal device appears to be redundant, and there are high requirements on the communication function of the lower-layer terminal device in terms of hardware design, circuit layout, and power consumption, which is not conducive to the design and development of the lower-layer terminal device itself. Optionally, the lower-layer terminal device 211, the lower-layer terminal device 212, the lower-layer terminal device 213 and the lower-layer terminal device 214 are all connected to the terminal, so that the requirements for data transmission and reception may be fulfilled by the terminal.

Based on the above communication system, the embodiment of the present disclosure provides a system for processing data. Reference is made to the following examples.

Figure 3:
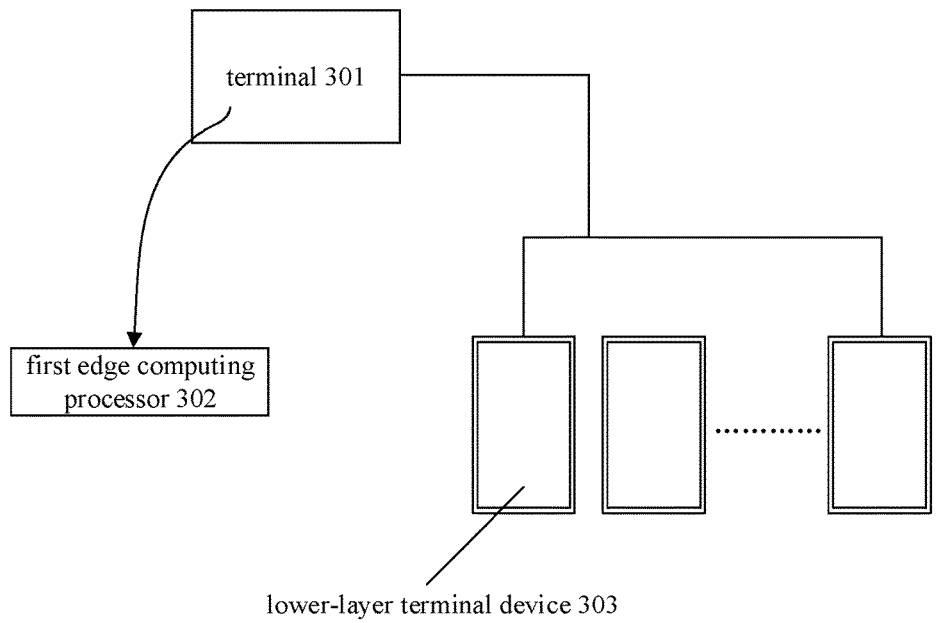
FIG. 3 illustrates a structural block diagram of a system for processing data according to an example of the present disclosure.

FIG. 3 illustrates a structural block diagram of a system for processing data according to an example of the present disclosure. The system includes a terminal 301 and a lower-layer terminal device 303, in which the terminal 301 is provided with an edge computing processor 302 configured to implement an edge computing function of the terminal. The terminal 301 supports a 5G-based relay communication technology from the terminal to the network. Sidelink connection is established between the terminal 301 and the lower-layer terminal device 303. Both the terminal and the lower-layer terminal device support 5G communication connection. Referring to FIG. 3, when the lower-layer terminal device 303 generates a data processing request due to a user operation, the lower-layer terminal device 303 may send the data processing request to the terminal 301 through the Sidelink connection, and the terminal 301 processes the data processing request with the edge computing function corresponding to the first edge computing processor 302 to obtain the processed result, and sends the processed result back to the lower-layer terminal device 303 through the Sidelink connection, so as to solve the data processing request of the lower-layer terminal device 303. In the embodiment, the terminal 301 may be implemented as a form of products including, a smart home device such as a smart speaker, a part of a gateway device such as a router and a switch, a smart middle-station management and control device for a wearable device.

In the embodiment of the present disclosure, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency of lower-layer terminal devices.

Figure 4:
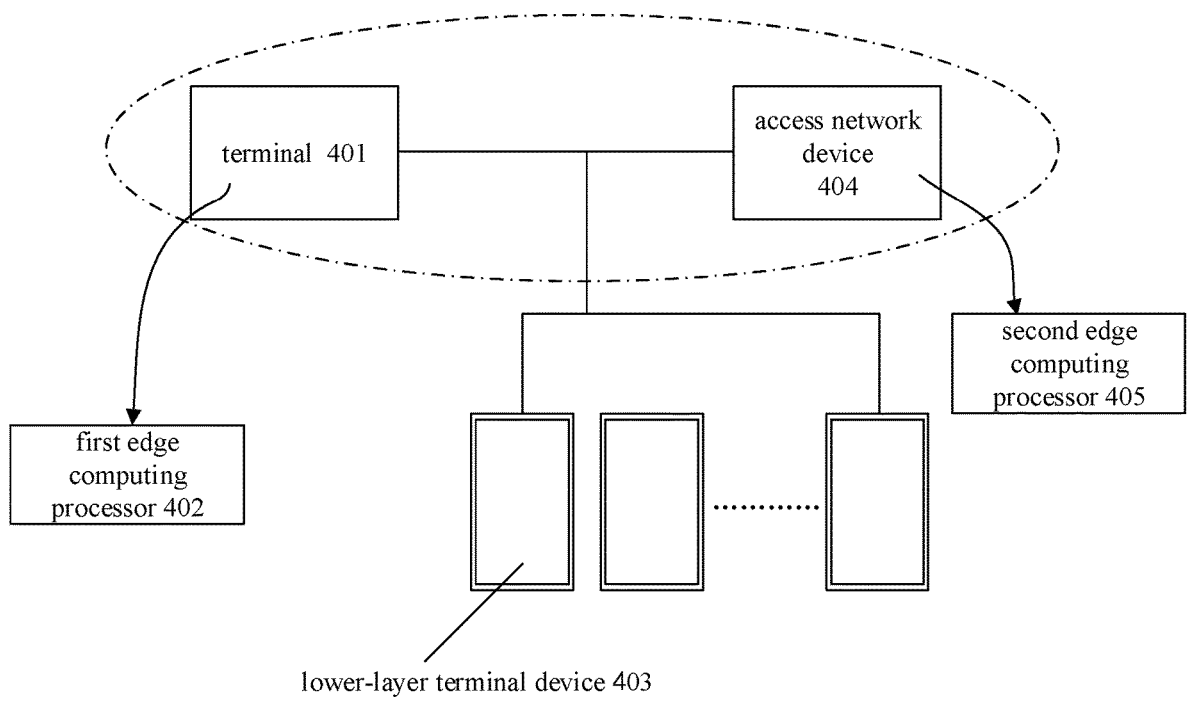
FIG. 4 illustrates a structural block diagram of a system for processing data according to an example of the present disclosure.

FIG. 4 illustrates a structural block diagram of a system for processing data according to an example of the present disclosure. The system includes a terminal 401, a lower-layer terminal device 403, and an access network device 404, in which the terminal 401 is provided with a first edge computing processor 402. Sidelink connection is established between the terminal 401 and the lower-layer terminal device 403, and a communication connection is established between the terminal 401 and the access network device 404.

Referring to FIG. 4, when the lower-layer terminal device 403 generates a data processing request due to a user operation, the lower-layer terminal device 403 may send the data processing request to the terminal 401 through the Sidelink connection, and the terminal 401 may process the data processing request through the first edge computing processor 402. When the first edge computing processor 402 completes processing of the data processing request to obtain the first processed result. In addition, the terminal 401 may relay the data processing request to the access network device 404 based on relay communication technology. The access network device 404 may process the data processing request through a second edge computing processor 405. When the second edge computing processor 405 completes processing of the data processing request to obtain a second processed result. In an embodiment, when the second processed result is consistent with the first processed result, the first processed result is sent to the lower-layer terminal device. In an embodiment, when the second processed result is not consistent with the first processed result, the terminal may report an error message to the lower-layer terminal device 403, in which the error message indicates there is an error for the first processed result. In an embodiment, when the second processed result is not consistent with the first processed result, the terminal may send the second processed result from the access network device to the lower-layer terminal device 403.

In addition, a 5G-based relay communication technology from the terminal to the network supported by the terminal 401 may enable the terminal to complete a relay function when the lower-layer terminal device is connected to the access network device. In the embodiment, the terminal 401 may be implemented as a form of products including, a smart home device such as a smart speaker, a part of a gateway device such as a router and a switch, and a smart middle-station management and control device for a wearable device.

In the embodiment of the present disclosure, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency by lower-layer terminal devices. Through the communication connection between the terminal and the access network device, the terminal may send the data request that cannot be processed by edge computing software corresponding to the edge computing processor to the access network device, so that the access network device may process the data request, which further improves the data processing success rate by lower-layer terminal devices.

Figure 5:
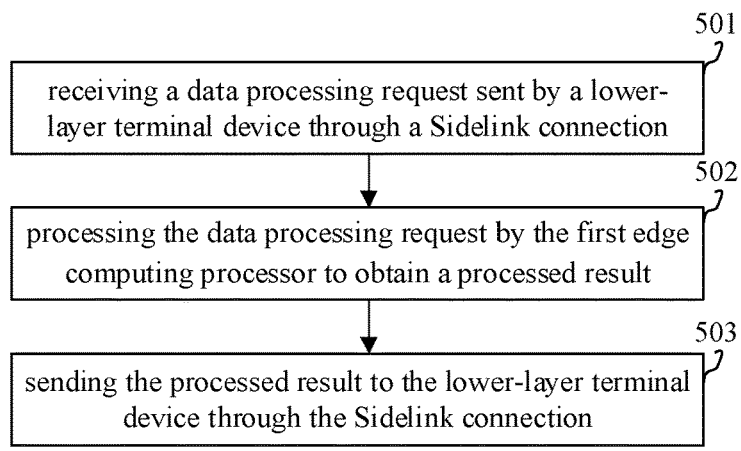
FIG. 5 illustrates a method for processing data according to an example of the present disclosure.

In combination with the above description, FIG. 5 is a method for processing data according to an example of the present disclosure, and the method is applied to a terminal that is set with a first edge computing processor, supports 5G communication connection and a 5G-based relay communication technology from the terminal to the network. The terminal is taken as an example for description. As illustrated in FIG. 5, the method includes the steps at 501-503.

At step 501, a data processing request is received. The request is sent by a lower-layer terminal device through a Sidelink connection.

Optionally, in the embodiment, the terminal may be implemented as a mobile terminal taking a mobile communication device as an example, or may be implemented as a product form including a smart home device such as a smart speaker, a part of a gateway device such as a router and a switch, a wearable device, and a smart middle-station management and control device. In an example, the terminal is implemented as an on-board device, and when the lower-layer terminal device has a Sidelink connection function, it may perform Sidelink connection with the on-board device.

Optionally, the terminal is connected with the lower-layer terminal device through the Sidelink connection, so the terminal needs to have the capability of meeting channel transmission for a physical layer and a media access control layer of the base station. Optionally, the terminal sends a configuration signaling to the lower-layer terminal device, and the configuration signaling includes at least one of a radio resource control (RRC) signaling, a medium access control-control element signaling or a physical layer signaling. The configuration signaling is carried with an information field, in which the information field is configured to indicate a sending format of the data processing request. Optionally, the configuration signaling is obtained by the terminal from scheduling information. Since the terminal has the ability of accessing the 5G network, the terminal in an example is connected to the access network device, so as to obtain the scheduling information from the access network device, read the configuration signaling from the scheduling information, and send the configuration signaling to the lower-layer terminal device. In an example, the sending format of the data processing request includes at least one of a packet size for sending a request file with the data processing request once, a number of times of sending the request file, and the frequency of sending the request file. In an example, the data processing request of the lower-layer terminal device includes a request for obtaining corresponding data and the corresponding data is sent to the lower-layer terminal device. In another example, the data processing request of the lower-layer terminal device includes requesting the terminal to perform data calculation and processing, and the processed result is sent to the lower-layer terminal device.

Optionally, the terminal also supports a 5G-based relay communication technology from the terminal to the network, so as to play a relay role in the process of connecting the lower-layer terminal device to other communication networks.

At step 502, the data processing request is processed by the first edge computing processor to obtain a processed result.

Optionally, the edge computing processor is a combination of software and hardware that enables the terminal to serve as an edge node of the central server. Optionally, at the hardware side, the edge computing processor is implemented as a combination of a separate data processor and a memory, and is placed within the terminal as a part of the terminal hardware structure; at the software side, the edge computing processor is implemented as an application program that may interact with the terminal user. In an example, when the terminal is implemented as a mobile phone, the first edge computing processor is implemented as a processor and a memory built into the mobile phone in the hardware part, and is implemented as an application program in the software part, the lower-layer terminal device is implemented as a wearable smart bracelet that has a Sidelink connection function with the terminal in terms of the communication capability and has a display function in terms of the application capability. The wearable smart bracelet may obtain a daily step count of the user from the terminal and display the daily step count on a display screen, in which the daily step count of the user are stored in a central server. In this case, the daily step count of the user are optionally also stored in the edge computing software corresponding to the edge computing processor built in the terminal, and when the wearable smart bracelet sends a data processing request that includes obtaining the daily step count of the user and meets a sending format to the terminal, the terminal may obtain the data through the edge computing software corresponding to the first edge computing processor. Optionally, the speed and the accuracy of the terminal obtaining the data from the edge computing software may be faster than those of obtaining the data from an edge node set in other access network devices for the central server or directly from the central server.

Optionally, the first edge computing processor has high requirements on the computing capability of the terminal. In an example, the terminal is implemented as a mobile phone, and at this time, an additional processor is optionally configured for the edge computing software corresponding to the first edge computing processor built in the mobile phone. Optionally, the usage of the edge computing software corresponding to the first edge computing processor built in the mobile phone exists independently of the usage of the mobile phone. That is, the data processing request may be completed in a state of being power-on and performing Sidelink connection with the lower-layer terminal device, without conflicting with the normal use of the mobile phone.

At step 503, the processed result is sent to the lower-layer terminal device through the Sidelink connection.

Optionally, when the first edge computing processor processes the data processing request and obtains the processed result, the terminal sends the processed result to the lower-layer terminal device through the Sidelink connection with the lower-layer terminal device, and the lower-layer terminal device performs subsequent actions according to the processed result. In an example, the terminal is implemented as a mobile phone, and the lower-layer terminal device is implemented as a wearable smart bracelet that has a Sidelink connection function with the terminal in terms of the communication capability and has a display function in terms of the application capability. When the wearable smart bracelet receives the processed result from the terminal, it may read signals in the processed result, and finally display the step count information of the user on the day on the display screen.

To sum up, with the method in the embodiment, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency of lower-layer terminal devices. The edge node is set in the terminal, and is enabled to have the Sidelink capability and the data processing capability from the hardware and communication design level, which further improves the success rate of processing the data processing request by the lower-layer terminal device.

Figure 6:
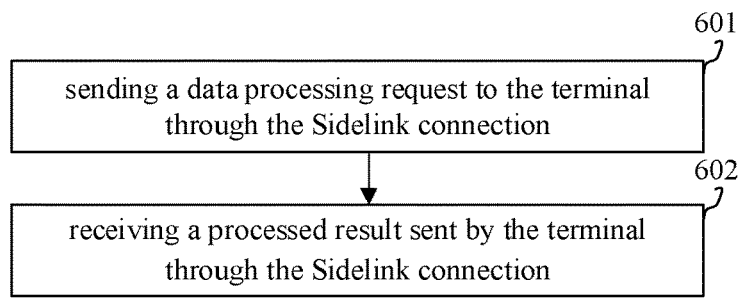
FIG. 6 illustrates a method for processing data according to an example of the present disclosure.

FIG. 6 illustrates a method for processing data according to an example of the present disclosure, and the method is applied to a lower-layer terminal device that is in a Sidelink connection to a terminal provided with an edge computing processor for illustration as an example. As illustrated in FIG. 6, the method includes the steps at 601-602.

At step 601, a data processing request is sent to a terminal through a Sidelink connection.

Optionally, the lower-layer terminal device may be implemented as a wearable device with a Sidelink capability, or other terminal device at least including the Sidelink capability. In an example, the lower-layer terminal device may be implemented as an audio-video device with the Sidelink function in terms of communication capability.

Optionally, the lower-layer terminal device has the Sidelink capability of connecting with the terminal. Correspondingly, the requirements for other communication capabilities of the lower-layer terminal device may be reduced. In an example, the lower-layer terminal device is implemented as a wearable smart bracelet, then the wearable smart bracelet needs to have the ability of connecting to the terminal through the Sidelink connection, and in addition to that, the lower-layer terminal device has no additional requirements for the communication capability. After the lower-layer terminal device is set to have the ability of connecting to the terminal through the Sidelink connection, other requirements of the lower-layer terminal device may be correspondingly reduced, such as reducing power consumption used by its original capability for cellular data transmission or reducing its antenna Multiple-Input Multiple-Output (MIMO) capability (that is, reducing the number of antennas in the lower-layer terminal device). Optionally, the lower-layer terminal device and the terminal are connected through the Sidelink connection.

At step 602, the processed result sent by the terminal through the Sidelink connection is received.

Optionally, the processed result is obtained by the terminal through a first edge computing processor, in which the first edge computing processor is configured to implement an edge computing function of the terminal.

Optionally, the lower-layer terminal device receives the processed result of the terminal through the Sidelink connection. Optionally, after receiving the processed result sent by the terminal, the lower-layer terminal device in the Sidelink may perform further actions according to its own programs and the processed result. In an example, the lower-layer terminal device is implemented as a wearable smart bracelet. When the wearable smart bracelet sends a data processing request to the terminal, in which the request indicates to obtain step count of a user on the day, and after data processing is performed by the edge computing software in the terminal, the processed result is sent to the wearable smart bracelet. After receiving the processed result, it means that the wearable smart bracelet has received the step count data of the user on the day, and the wearable smart bracelet reflects the data in its own built-in display through its internal signal conversion and data processing, so that the users may see their daily step counts.

In the embodiment of the present disclosure, the edge computing processor is set as an edge computing node in a terminal having a high degree of integration with the lower-layer terminal device, and the terminal with data processing capability and the lower-layer terminal device are connected through the Sidelink connection with lower communication requirements, which reduces redundant communication modes, improves the efficiency of edge nodes, and further improves the data processing efficiency by lower-layer terminal device. By setting the Sidelink communication capability for the lower-layer terminal device and simplifying other communication capabilities, redundant communication functions of the lower-layer terminal device are reduced, the cost of the lower-layer terminal device is reduced, and a space is provided for improving the performance of the lower-layer terminal device.

Figure 7:
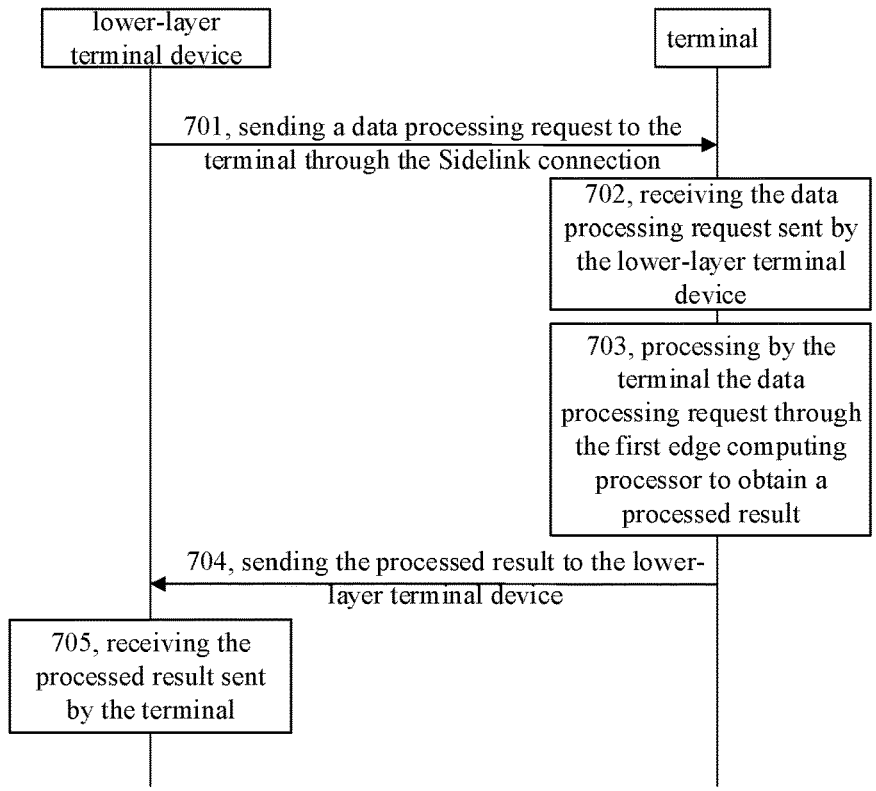
FIG. 7 illustrates a flowchart of a method for processing data according to an example of the present disclosure.

FIG. 7 illustrates a flowchart of a method for processing data according to an example of the present disclosure, and the method is applied to an information system. The information system includes a terminal provided with an edge computing processor and a lower-layer terminal device, in which a Sidelink connection is established between the terminal and the lower-layer terminal device. Taking the information system as an example, the method includes the steps at 701-705.

At step 701, the lower-layer terminal device sends a data processing request to the terminal through the Sidelink connection.

Optionally, the lower-layer terminal device may be implemented as a wearable device with Sidelink capability, or other terminal devices at least including the Sidelink capability. In an example, the lower-layer terminal device may be implemented as an audio-video device with the Sidelink function in terms of communication capability.

Optionally, since the Sidelink transmission achieves addressing through the source identifier and the target identifier of the media access control layer, there is no need to establish a connection in advance between the terminal and the lower-layer terminal device when connecting through the Sidelink connection.

Optionally, when the lower-layer terminal device has a function that cannot be realized without a communication connection, that is, when the lower-layer terminal device needs other terminals or servers to send data to it, or needs to process data with the help of data processors of other terminals or servers, the data processing request is then obtained from the terminal.

At step 702, the terminal receives the data processing request sent by the lower-layer terminal device.

Optionally, in the embodiment, the terminal may be implemented as a mobile terminal taking a mobile communication device as an example, or may be implemented as a form of products including, a smart home device such as a smart speaker, a part of a gateway device such as a router and a switch, a smart middle-station management and control device for a wearable device. In an example, the terminal is implemented as an on-board (vehicle-mounted) device. Correspondingly, the lower-layer terminal device is implemented as an audio and video playback device that has a Sidelink function in terms of communication capability. That is, the two devices may be connected through the Sidelink connection. Optionally, one terminal may be connected to multiple lower-layer terminal devices at the same time. In an example, the terminal is implemented as a vehicle-mounted device, and the lower-layer terminal devices are implemented as a speaker, an audio and video playback device, and a wearable smart bracelet with an audio playback function. The communication capability and processing capability of the vehicle-mounted device are allowed, the three lower-layer terminal devices may be connected to the vehicle-mounted device at the same time.

Optionally, the terminal processes data in response to receiving the data processing request sent by the lower-layer terminal device. Optionally, processing by the terminal the data processing request sent by the lower-layer terminal device is not performed in a central processor of the terminal's own function. In an example, the terminal is implemented as a vehicle-mounted device. Correspondingly, the lower-layer terminal device is implemented as an audio and video playback device, and the central processing unit of the vehicle-mounted device for processing its own data does not process the data processing request sent by the audio and video playback device. Optionally, the vehicle-mounted device is provided with an additional processor for processing the data processing request sent by the audio and video playback device.

At step 703, the terminal processes the data processing request through the first edge computing processor to obtain a processed result.

Optionally, the edge computing processor is a combination of hardware and software that enables the terminal to function as an edge node of a central server. Optionally, at the hardware side, it is implemented as a combination of a separate data processor and a memory and is placed within the terminal as a part of the terminal hardware structure; at the software side, it is implemented as an application program that may interact with the terminal user. Optionally, in the edge computing node, the central server may configure the resources needed by the lower-layer terminal device corresponding to the terminal and may provide a computing capability for processing data needed by the lower-layer terminal device corresponding to the terminal. Optionally, the central server periodically sends data to the terminal. In an example, the terminal is implemented as a mobile phone, and the lower-layer terminal device is implemented as a wearable smart bracelet. The wearable smart bracelet needs to obtain daily step count data of a user recorded by the processor built in the mobile phone and sent to the central server for storage. At this time, the central server may periodically send the daily step count data to the edge computing node corresponding to the terminal, i.e., to a storage and computing software corresponding to the first edge computing processor. In an example, the central server sends the daily step count data of the user to the edge computing node corresponding to the terminal every 30 minutes. Optionally, when the wearable bracelet sends a data processing request, the terminal receives the data processing request and processes the data processing request through the storage and computing software corresponding to the first edge computing processor. Optionally, at this time, the latest daily step count data of the user and data time which are sent to and stored by the central server are determined as the processed result. At step 704, the terminal sends the processed result to the lower-layer terminal device.

After the terminal obtains the processed result, the terminal may send the processed result to the lower-layer terminal device. Optionally, the transmission process is also performed through the Sidelink connection between the two devices.

At step 705, the lower-layer terminal device receives the processed result sent by the terminal.

Optionally, after receiving the processed result sent by the terminal, the lower-layer terminal device in Sidelink may perform further actions according to its own programs and the processed result. In the example illustrated in step 703, after the wearable smart bracelet receives the daily step count data and time from the mobile phone, the data may be reflected on its own display screen through internal signal conversion and data processing, so that users may see their own step counts on the day, which achieves its own function of displaying a step count.

To sum up, with the method in this embodiment, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency of lower-layer terminal devices. Through the connection between the lower-layer terminal device with the Sidelink and the terminal equipped with the edge computing node, the edge computing node is enabled to be closer to the terminal and the lower-layer terminal device, the communication requirements of the lower-layer terminal device are reduced, and the data processing is faster. By setting the Sidelink capability of the lower-layer terminal device and simplifying other communication capabilities, the redundant communication functions of the lower-layer terminal device are reduced, the cost of the lower-layer terminal device is reduced, and a space is provided for improving the performance of the lower-layer terminal device. The data processing is more regular and integrated through the connection between the lower-layer terminal device and the terminal.

Figure 8:
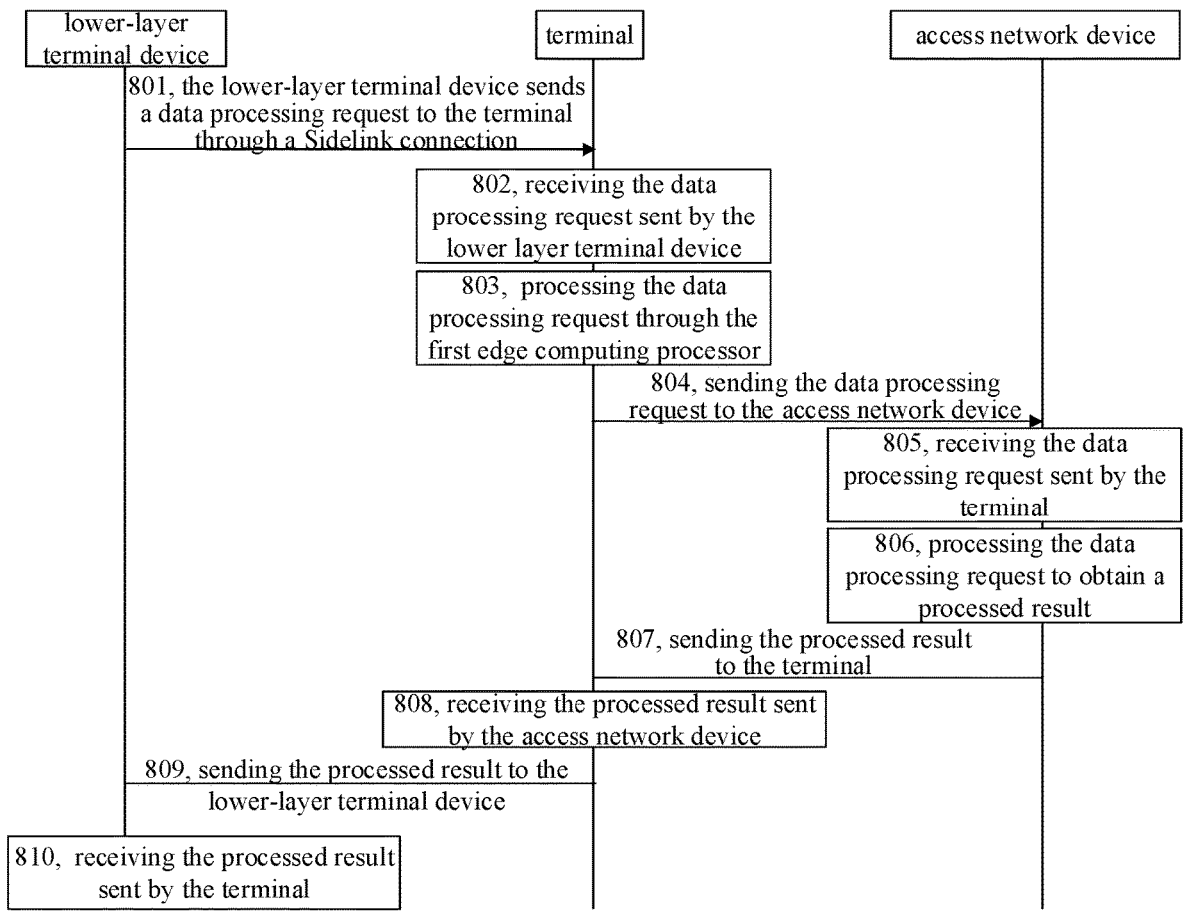
FIG. 8 illustrates a flowchart of a method for processing data according to an example of the present disclosure.

FIG. 8 illustrates a flowchart of a method for processing data according to an example of the present disclosure. Taking as an example the method applied to the information system of the embodiment illustrated in FIG. 7, in which the information system further includes an access network device, the method includes the steps at 801-809.

At step 801, the lower-layer terminal device sends a data processing request to the terminal through a Sidelink connection.

At step 802, the terminal receives the data processing request sent by the lower-layer terminal device.

Optionally, the above steps are the same as the steps 701 to 702 in the method for processing data of the embodiment illustrated in FIG. 7. Optionally, the lower-layer terminal device may be implemented as a wearable device with a Sidelink capability or other terminal devices at least including the Sidelink capability. In an example, the lower-layer terminal device may be implemented as an audio and video device that has the Sidelink function in terms of communication capability; the terminal may be implemented as a mobile terminal such as a mobile communication device, or may be implemented as a product form including a smart home device such as a smart speaker, a part of a gateway device such as a router and a switch, a wearable device, and a smart middle-station management and control device.

At step 803, the terminal processes the data processing request through the first edge computing processor.

At step 804, when the first edge computing processor cannot process the data processing request, the data processing request is sent to the access network device.

Optionally, the edge computing processor is a combination of hardware and software that enables the terminal to function as an edge node of a central server. Optionally, at the hardware side, it is implemented as a combination of a separate data processor and a memory and is placed within the terminal as a part of the terminal hardware structure; at the software side, it is implemented as an application program that may interact with the terminal user. Optionally, since the hardware of the edge computing processor is set in a terminal with other functions, the hardware side of the edge computing processor may be limited by the terminal hardware layout requirements without affecting the normal operation of the terminal. In an example, the terminal is implemented as a mobile phone, and the arrangement of the hardware device supporting the operation of its edge computing processor, for example, a processing chip, may be restricted by the hardware arrangement of other components inside the mobile phone.

Optionally, the first edge computing processor cannot process the data processing request for various reasons including, the computing capability of the first edge computing processor is insufficient to process the data processing request, and the data processing request cannot be processed since the corresponding information is not stored in the software corresponding to the first edge computing processor. To sum up, these reasons may all be attributed to the fact that the data storage and edge computing functions of the edge node corresponding to the first edge processor are not powerful enough. At this time, other edge nodes or central servers need to be used for function processing.

Optionally, the terminal has the function of connecting with the access network device in addition to the function of performing the Sidelink with the lower-layer terminal device. Optionally, the terminal connects with the gNB through cellular data. Optionally, the central server configures a corresponding edge computing node for the gNB, that is, the second edge node. In this edge computing node, the gNB may perform the same processing on the received information.

Optionally, a dedicated detection link for ensuring quality of service (QOS) is established between the terminal and the base station. Optionally, when the terminal is connected to the base station and the terminal simultaneously performs data processing on the data request from the lower-layer terminal device, the QoS detection link may detect connection quality between the base station and the terminal to ensure that the connection established between the terminal and the base station may not affect other normal operations of the terminal during the data processing. Optionally, the QoS detection link may measure parameters such as a packet loss rate, transmission relay, relay jitter, and a bandwidth during the connection process, report to the access network device when an abnormality is found, and provide the allocation of dynamic bandwidth with the terminal for eliminating the abnormality. Optionally, the access network device reserves enough network resources for the terminal in advance. In an example, the access network device reserves enough network resources for the terminal in advance through network slicing technology.

Optionally, when the terminal cannot process the data processing request sent by the lower-layer terminal device, the terminal sends the information to the access network device so that the more powerful data storage and edge computing functions of the access network device are used to process the data processing request sent by the lower-layer terminal device.

At step 805, the access network device receives the data processing request sent by the terminal.

At step 806, the access network device processes the data processing request to obtain a processed result.

Optionally, the processing of the data processing request by the access network device is completed in an edge computing node corresponding to the access network device (that is, a node corresponding to the second edge computing processor). The second edge computing node also has resources configured by the central server and the computing capability for data processing. In an example, the terminal is implemented as a mobile phone, and the lower-layer terminal device is implemented as a wearable smart bracelet. The wearable smart bracelet needs to obtain daily step count data of a user recorded by a device built in the mobile phone and sent to the central server for storage. At this time, the central server may periodically send the daily step count data to an edge computing node corresponding to the first edge computing processor set by the terminal. The central server sends the daily step count data of the user to the edge computing node corresponding to the first edge computing processor set by the terminal every 30 minutes. Optionally, when the wearable bracelet sends a data processing request for obtaining real-time step count information, the terminal receives and sends the data processing request to the access network device through a connection with the access network device since the data processing request cannot be processed due to the time when the central server sends the data. Optionally, the access network device is implemented as gNB, with the connection mode being cellular connection. The gNB is also configured with an edge computing node (that is, the node corresponding to the second edge computing processor). The central server sends the daily step count data of the user to the edge computing node in real time since data in the edge computing node is updated quickly and has strong data storage capacity, and updates the daily step count data. Optionally, at this time, the gNB retrieves the daily step count data updated in real time as the processed result.

Optionally, when the edge computing node corresponding to the second edge computing processor set by the access network device is still unable to perform data processing, the data processing request may be sent to an upper-layer access network device, or sent to the central server for data processing.

Optionally, after repeatedly receiving the same data processing request from the terminal, the access network device may configure new data according to the data processing capability of the edge computing node corresponding to the edge computing processor set by the terminal.

At step 807, the access network device sends the processed result to the terminal.

At step 808, the terminal receives the processed result sent by the access network device.

Optionally, the processed result is first sent by the access network device to the terminal. Optionally, the data format sent by the access network device to the terminal may be different from the data format for data transmission between the terminal and the lower-layer terminal device through the Sidelink connection. At this time, the terminal needs to perform format processing on the processed result for sending. Optionally, the terminal supports a 5G-based relay communication technology from the terminal to the network. That is, at this time, the connection between the lower-layer terminal device and the access network device may be considered as a 5G cellular data connection, and the terminal is operated as a relay interface for communication between the two devices. In fact, the terminal is connected to the access network device through the 5G cellular data connection, and the lower-layer terminal device is connected to the terminal through the Sidelink connection. However, the relay communication technology supported by the terminal may speed up the data transmission between the access network device and the lower-layer terminal device.

At step 809, the terminal sends the processed result to the lower-layer terminal device.

At step 810, the lower-layer terminal device receives the processed result sent by the terminal.

Optionally, after receiving the processed result sent by the terminal, the lower-layer terminal device in the Sidelink may perform further actions according to its own programs and the processed result. In the example illustrated in step 806, when the wearable smart bracelet receives the real-time daily step count data actually from the access network device, the data may be reflected on the built-in display screen through internal signal conversion and data processing, so that users may see their own step counts on the day, which achieves its own function of displaying a step count.

To sum up, with the method in this embodiment, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency by lower-layer terminal devices. Through the connection between the lower-layer terminal device with the Sidelink and the terminal equipped with edge computing nodes, the edge computing node is enabled to be closer to the terminal and the lower-layer terminal device, the communication requirements of the lower-layer terminal device are reduced, and the data processing is faster. By setting the Sidelink capability of the lower-layer terminal device and simplifying other communication capabilities, the redundant communication functions of the lower-layer terminal device are reduced, the cost of the lower-layer terminal device is reduced, and a space is provided for improving the performance of the lower-layer terminal device. The data processing is more regular and integrated through the connection between the lower-layer terminal device and the terminal. By setting the access network device, multilevel deploying of the edge nodes is realized, so that the data processing request that cannot be processed by the edge node corresponding to the terminal may be processed in the upper-layer edge node or the central server, which further improves the success rate of data processing. Through the 5G-based relay communication technology from the terminal to the network supported by the terminal, the data transmission efficiency between the access network device and the lower-layer terminal device is higher even if the lower-layer terminal device does not support additional communication connection method.

Figure 9:
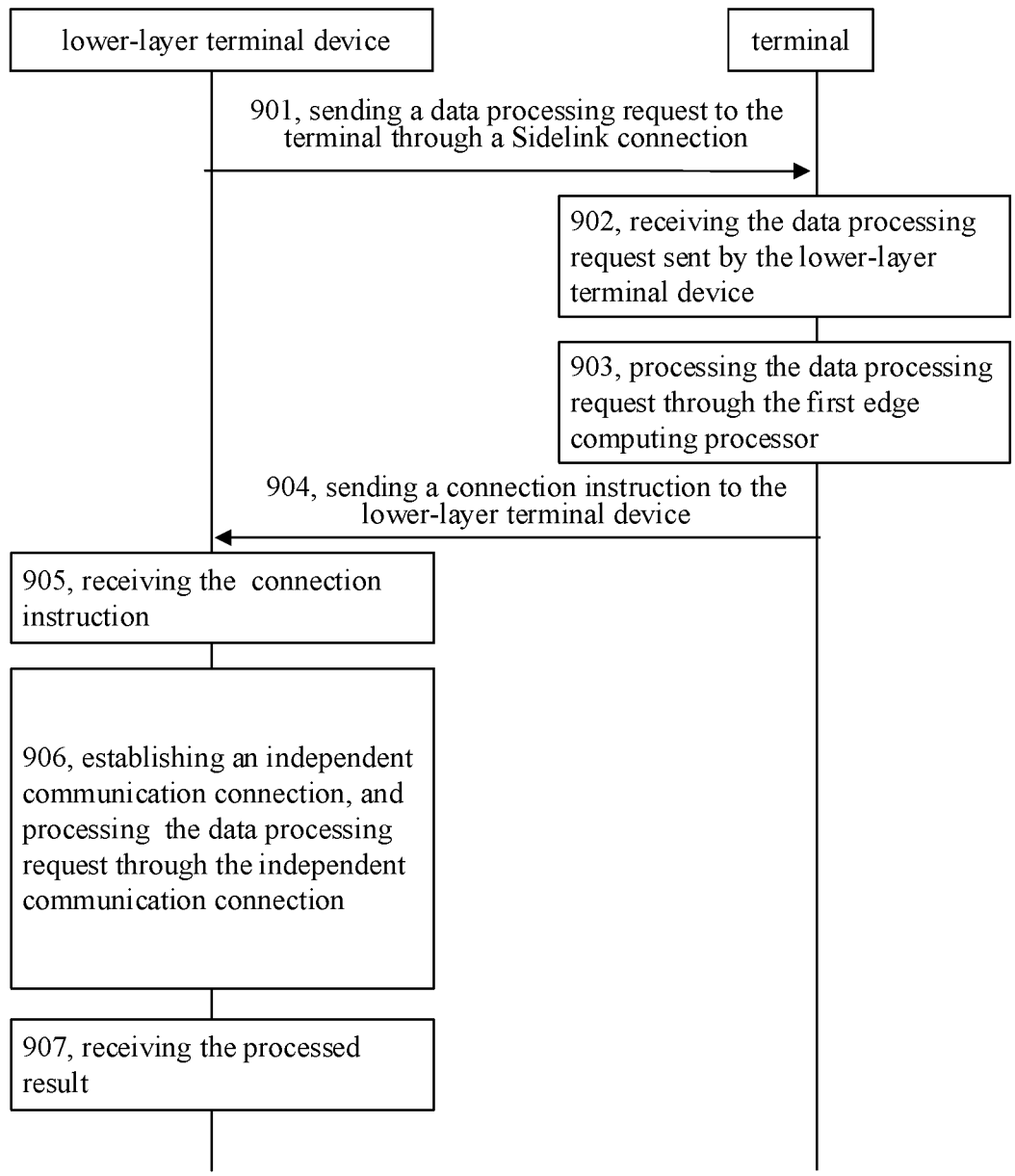
FIG. 9 illustrates a flowchart of a method for processing data according to an example of the present disclosure.

FIG. 9 illustrates a flowchart of a method for processing data according to an example of the present disclosure. Taking as an example that the method is applied to the information system of the embodiment illustrated in FIG. 7, the method includes the following steps at 901-907.

At step 901, the lower-layer terminal device sends a data processing request to the terminal through a Sidelink connection.

At step 902, the terminal receives the data processing request sent by the lower-layer terminal device.

At step 903, the terminal processes the data processing request through the first edge computing processor.

Optionally, the steps 901 to 903 are the same as the steps 801 to 803 in the method for processing data of the embodiment described in FIG. 8. Optionally, the lower-layer terminal device may be implemented as a wearable device with a Sidelink capability or other terminal devices at least including the Sidelink capability. In an example, the lower-layer terminal device may be implemented as an audio and video device that has the Sidelink function in terms of communication capability; the terminal may be implemented as a mobile terminal such as a mobile communication device, or may be implemented as a product form including a smart home device such as a smart speaker, a part of a gateway device such as a router and a switch, a wearable device, and a smart middle-station management and control device.

At step 904, when the first edge computing processor cannot process the data processing request, send a connection instruction to the lower-layer terminal device.

Optionally, the lower-layer terminal device described in this embodiment further has an independent communication capability which is used to indicate that the lower-layer terminal device includes a capability of establishing a communication connection independent of the terminal. In an example, the lower-layer terminal device is implemented as a wearable smart bracelet, which connects with the access network device through a cellular data connection in addition to the Sidelink connection with the terminal.

Optionally, when the lower-layer terminal device has an independent communication function, the data processing request sent by the lower-layer terminal device may include report information for indicating that the lower-layer terminal device has the independent communication capability after the Sidelink is established. Optionally, the report information may also be sent independently before sending the data processing request.

Optionally, when the terminal cannot process the data request through the first edge computing processor, or the terminal cannot process the data request through the first edge computing processor in time due to high workloads of the terminal, the terminal detects whether the data processing request contains the above report information. When the data processing request includes the report information, the terminal stops processing the data through the first edge computing processor, and sends a connection instruction to the lower-layer terminal device.

In the above example, the terminal is implemented as a mobile phone. When the wearable bracelet sends a processing request that obtains a real-time step count of a user to the terminal. The terminal receives the data processing request, and detects whether the data processing request contains the above report information since the first edge computing processor is already processing other data and the communication loads are high. Optionally, the smart bracelet has a function of connecting with the access network device through a cellular data connection. At this time, the data processing request contains the report information, and the terminal stops processing the data processing request and sends the connection instruction to the lower terminal device.

At step 905, the lower-layer terminal device receives the connection instruction.

At step 906, the lower-layer terminal device establishes an independent communication connection, and processes the data processing request through the independent communication connection.

Optionally, after the lower-layer terminal device receives the connection instruction, the lower-layer terminal device may establish the independent communication connection. Optionally, the connection between the terminal and the lower-layer terminal device is not cut off in the process of performing the independent communication connection.

Optionally, when the lower-layer terminal is connected to the access network device through the 5G cellular connection, the terminal may act as a relay interface between the lower-layer terminal device and the access network device for improving transmission efficiency since the terminal supports a 5G-based relay communication technology from the terminal to the network.

In the example illustrated in step 904, after receiving the connection instruction, the lower-layer terminal device connects with the access network device through the cellular data, and sends the data processing request to the access network device. The access network device performs edge computing through the edge computing node corresponding to the edge computing processor set by itself, to obtain the processed result, or further sends the data processing request to the upper-layer access network device or the central server for data processing.

At step 907, the lower-layer terminal device receives the processed result.

Optionally, after receiving the processed result sent by the terminal, the lower-layer terminal device in the Sidelink may perform further actions according to its own programs and the processed result. In the example illustrated in step 904, when the wearable smart bracelet receives the real-time daily step count data actually from the access network device, the data may be reflected on the built-in display screen through internal signal conversion and data processing, so that users may see their own step counts on the day, which achieves its own function of displaying a step count.

To sum up, with the method in this embodiment, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency of lower-layer terminal devices. Through the connection between the lower-layer terminal device with the Sidelink and the terminal equipped with edge computing nodes, the edge computing node is enabled to be closer to the terminal and the lower-layer terminal device, the communication requirements of the lower-layer terminal device are reduced, and the data processing is faster. By setting the Sidelink capability of the lower-layer terminal device and simplifying other communication capabilities, the redundant communication functions of the lower-layer terminal device are reduced, the cost of the lower-layer terminal device is reduced, and a space is provided for improving the performance of the lower-layer terminal device. The data processing is more regular and integrated through the connection between the lower-layer terminal device and the terminal. By setting the lower-layer terminal device with the independent communication capability, the data may be processed independently when the terminal load is heavy or the data processing request cannot be processed, thus further improving the success rate of data processing.

Figure 10:
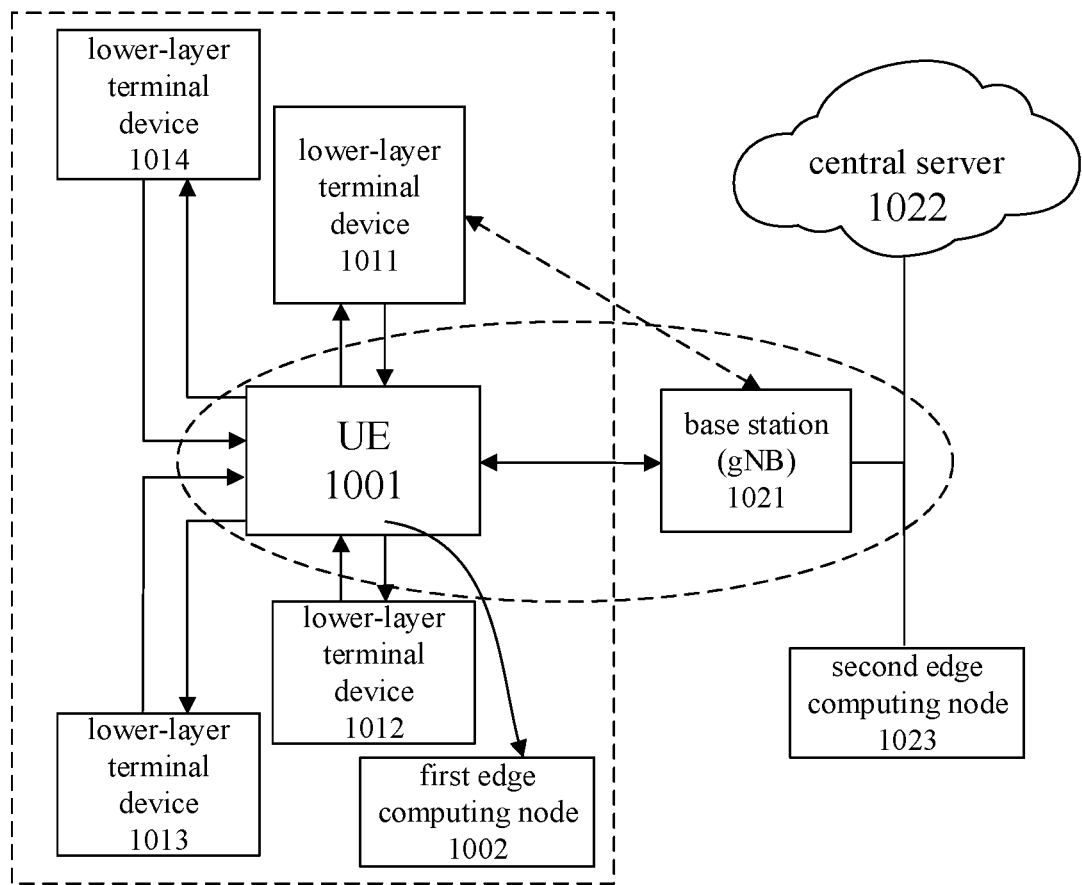
FIG. 10 illustrates a block diagram of a communication system according to an embodiment of the present disclosure.

FIG. 10 illustrates a block diagram of a communication system according to an embodiment of the present disclosure. As illustrated in FIG. 10, the communication system includes a user terminal 1001, a lower-layer terminal device 1011, a lower-layer terminal device 1012, and a lower-layer terminal device 1013, and a lower-layer terminal device 1014 of the user terminal. Optionally, the user terminal 1001 is connected to a base station 1021 in an access network device. The user terminal may be carried with a first edge computing node 1002 corresponding to the user terminal through configuration of hardware and configuration of edge computing software. The central server 1022 is configured for the base station 1021 with a second edge computing node 1023 corresponding to the base station 1021. The lower-layer terminal device 1011, the lower-layer terminal device 1012, the lower-layer terminal device 1013, and the lower-layer terminal device 1014 are all connected with the user terminal 1001 through a Sidelink connection.

When the lower-layer terminal device has a data processing request, it may send the data processing request to the user terminal 1001. At this time, the user terminal 1001 may process the data processing request to obtain a processed result by using an edge computing software corresponding to the built in first edge computing processor and resources configured by the central server 1022 for the first edge computing node 1002. When the user terminal 1001 cannot process the data processing request, it may send the data processing request to the base station 1021, and perform data processing to obtain the processed result through a second edge computing node 1023 corresponding to a second edge computing processor configured by the central server 1022 for the base station, or other advanced edge computing nodes, or the central server 1022. Finally, the processed result is sent to the lower-layer terminal device.

Optionally, the lower-layer terminal device may have the capability of independently communicating with the base station, which is different from the Sidelink capability. When the terminal cannot process the data processing request and sends a connection instruction to the lower-layer terminal device according to the report information, independent data processing may also be performed by connecting to the access network device or other central server through the independent communication capability of the lower-layer terminal device.

In the embodiment of the present disclosure, the edge computing processor is set as an edge computing node in a terminal having a high degree of integration with the lower-layer terminal device, and the terminal with data processing capability and the lower-layer terminal device are connected through the Sidelink connection having low communication requirements, which reduces redundant communication modes, improves the efficiency of edge nodes, and further improves the data processing efficiency by lower-layer terminal devices. Through the communication connection between the terminal and the access network device, the terminal may be enabled to send the data that cannot be processed by the edge computing processor to the access network device, so that the access network device processes the data, which further improves the success rate of data processing for the lower-layer terminal device.

Figure 11:
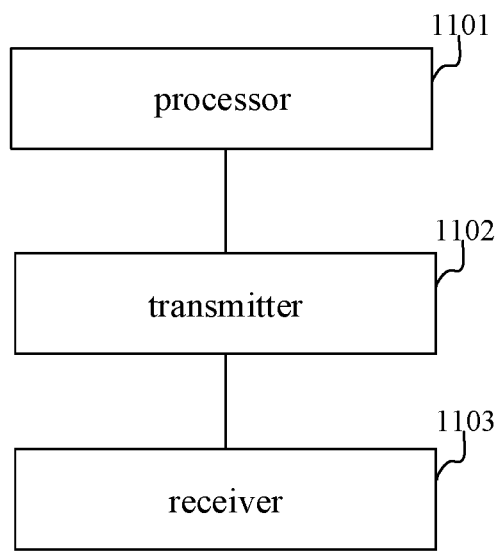
FIG. 11 illustrates a structural block diagram of an apparatus for processing data according to an embodiment of the present disclosure.

FIG. 11 illustrates a structural block diagram of an apparatus for processing data according to an embodiment of the present disclosure. The apparatus may be implemented as all or a part of a terminal device through software, hardware or their combination. The apparatus includes a receiver 1103, a processor 1101, and a transmitter 1102.

The receiver 1103 is configured to receive a data processing request sent by a lower-layer terminal device through a Sidelink connection.

The processor 1101 is configured to process the data processing request through a first edge computing processor to obtain a processed result.

The transmitter 1102 is configured to send the processed result to the lower-layer terminal device through the Sidelink connection.

In an optional embodiment, the processor 1101 is configured to relay the data processing request to an access network device through a relay communication technology.

The receiver 1103 is configured to receive the processed result from the access network device, in which the access network device is provided with a second edge computing processor, the second edge computing processor is configured to implement an edge computing function of the access network device.

The transmitter 1102 is configured to send the processed result to the lower-layer terminal device through the Sidelink connection based on the relay communication technology.

In an optional embodiment, the processor 1101 is configured to interact the processed result with the access network device to obtain an interaction result.

The transmitter 1102 is configured to send the processed result to the lower-layer terminal device through the Sidelink connection in response to the interaction result being consistent with the processed result.

In an optional embodiment, the receiver 1103 is configured to receive scheduling information sent by the access network device. The scheduling information is configured to configure a sending format of the data processing request.

The transmitter 1102 is configured to send a configuration signaling to the lower-layer terminal device through the Sidelink connection based on the scheduling information. The configuration signaling includes an information field configured to indicate a sending format of the data processing request.

The configuration signaling includes at least one of a radio resource control (RRC) signaling, a medium access control-control unit (MAC CE) signaling or a physical layer signaling.

In an optional embodiment, the receiver 1103 is configured to receive report information sent by the lower-layer terminal device. The report information is configured to indicate that the lower-layer terminal device has an independent communication capability.

The transmitter 1102 is configured to send a connection instruction to the lower-layer terminal device in response that the first edge computing processor cannot process the data processing request. The connection instruction is configured to instruct the lower-layer terminal device to establish an independent communication connection.

It should be noted that, the data processing apparatus according to the above-mentioned embodiments is illustrated by the division of the above-mentioned functional modules. In practical application, the above functions may be allocated by different functional modules according to needs, that is, the internal structure of the device may be divided into different functional modules to complete all or part of the functions described above.

Figure 12:
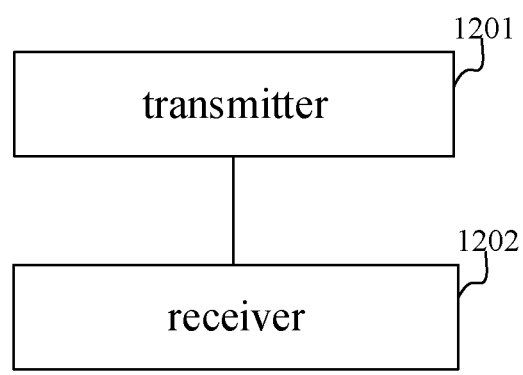
FIG. 12 illustrates a structural block diagram of an apparatus for processing data according to an embodiment of the present disclosure.

FIG. 12 illustrates a structural block diagram of an apparatus for processing data according to an embodiment of the present disclosure. The apparatus may be implemented as all or a part of a terminal device through software, hardware or their combination. The apparatus includes a transmitter 1201 and a receiver 1202.

The transmitter 1201 is configured to send a data processing request to a terminal through a Sidelink connection.

The receiver 1202 is configured to receive a processed result sent by the terminal through the Sidelink connection. The processed result is obtained by the terminal through a first edge computing processor, and the first edge computing processor is configured to implement an edge computing function of the terminal.

In an optional embodiment, the receiver 1202 is configured to receive the processed result through the Sidelink connection. The processed result is obtained after the access network device interacts with the terminal.

In an optional embodiment, the receiver 1202 is configured to receive a configuration signaling sent by the terminal. The configuration signaling includes an information field configured to indicate a sending format of the data processing request and is sent to the lower-layer terminal device after the terminal receives the scheduling information sent by the access network device.

The configuration signaling includes at least one of a radio resource control (RRC) signaling, a medium access control-control unit (MAC CE) signaling or a physical layer signaling.

In an optional embodiment, the transmitter 1201 is configured to send report information to the terminal. The report information is configured to indicate that the lower-layer terminal device has an independent communication capability.

The receiver 1202 is configured to receive a connection instruction sent by the terminal through the Sidelink connection, and establish an independent communication connection based on the connection instruction.

It should be noted that: the data processing apparatus according to the above-mentioned embodiments is illustrated by the division of the above-mentioned functional modules. In practical application, the above functions may be allocated by different functional modules according to needs, that is, the internal structure of the device may be divided into different functional modules to complete all or part of the functions described above.

Figure 13:
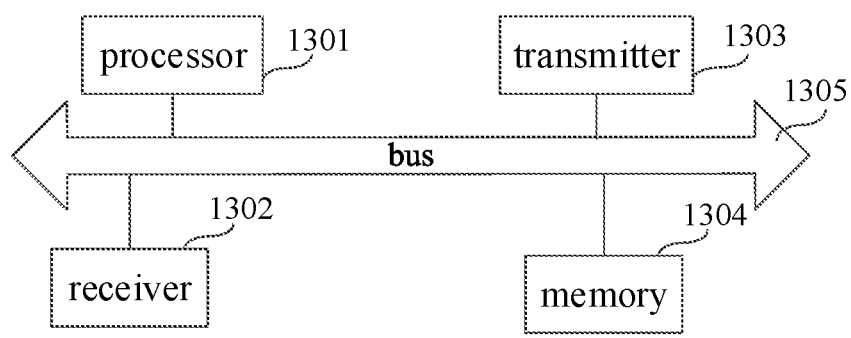
FIG. 13 illustrates a structural schematic diagram of a terminal for processing data according to an embodiment of the present disclosure.

FIG. 13 illustrates a structural schematic diagram of a terminal for processing data according to an embodiment of the present disclosure. The UE includes a processor 1301, a receiver 1302, a transmitter 1303 and a memory 1304.

The processor 1301 includes one or more processing cores, and the processor 1301 executes various functional applications and data processing by running software programs and modules.

The receiver 1302 and the transmitter 1303 may be implemented as a communication component, which may be a communication chip.

The memory 1304 is connected to the processor 1301 through a bus 1305.

The memory 1304 may be configured to store at least one instruction, and the processor 1301 may be configured to execute the at least one instruction to implement various steps in the above method embodiments.

The embodiment of the present disclosure further provides a computer device. The computer device includes a memory and a processor. The memory is stored with at least one instruction, at least one program, a set of codes or a set of instructions, which are loaded by the processor to implement the methods for processing data described above.

The embodiment of the present disclosure further provides a computer-readable storage medium. At least one instruction, at least one program, a set of codes or a set of instructions are stored in the readable storage medium. The at least one instruction, at least one program, the set of codes or the set of instructions are loaded and executed by the processor to implement the above methods for processing data.

The present disclosure also provides a computer program product, which, when the computer program product runs on a computer, the computer is caused to execute the methods for processing data according to the above method embodiments.

Those skilled in the art may understand that all or part of the steps in the various methods of the above embodiments may be completed by instructing relevant hardware through a program, and the program may be stored in a computer-readable storage medium. The computer-readable storage medium may be one included in the memory in the above-mentioned embodiments or may also be one that exists independently and is not assembled into a terminal. The computer-readable storage medium is stored with at least one instruction, at least one program, a set of codes or a set of instructions, which are loaded and executed by the processor to implement the above methods for processing data.

Optionally, the computer-readable storage medium may include: a read only memory (ROM), a random access memory (RAM), a solid state drive (SSD), or an optical disc. The random access memory may include a resistive random access memory (ReRAM) and a dynamic random access memory (DRAM).

Those skilled in the art may understand that all or part of the steps of implementing the above embodiments may be completed by hardware, or may be completed by instructing relevant hardware through a program, and the program may be stored in a computer-readable storage medium. The storage medium may be a read-only memory, a magnetic disk or an optical disk, etc.

The above are only optional embodiments of the present disclosure, and are not intended to limit the present disclosure.

The communication systems and service scenarios described in the embodiments of the present disclosure are for the purpose of illustrating the technical solutions of the embodiments of the present disclosure more clearly, and do not constitute a limitation on the technical solutions according to the embodiments of the present disclosure. With the evolution of new business scenarios and the emergence of new business scenarios, the technical solutions according to the embodiments of the present disclosure are also applicable to similar technical problems.

It should be understood that the reference to "a plurality of" herein means two or more, and the term "and/or" describes an association relationship of the associated objects, which means that there may be three kinds of relationships, for example, A and/or B, which may mean that A exists alone, A and B exist at the same time, and B exists alone. The character "/" generally indicates that the associated objects are in an "or" relationship.

Other embodiments of the present disclosure may readily occur to those skilled in the art upon consideration of the specification and practice of the invention disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as exemplary, with the true scope and spirit of the disclosure being indicated by the following claims.

It should be understood that the present disclosure is not limited to the precise structure described above and illustrated in the drawings, and various modifications and changes may be made without departing from its scope. The scope of the present application is limited by the appended claims.

What is claimed is:

1. A system for processing data, comprising:
a terminal provided with a first edge computing processor, wherein the first edge computing processor is configured to implement an edge computing function of the terminal, and the terminal supports a 5G-based relay communication technology from the terminal to the network; and
a lower-layer terminal device configured to send a data processing request to the terminal through a Sidelink connection established between the terminal and the lower-layer terminal device;
wherein 5G communication connection is supported by both the terminal and the lower-layer terminal device;
wherein the terminal is configured to receive the data processing request; process the data processing request through the first edge computing processor to obtain a first processed result; and send the first processed result through the Sidelink connection to the lower-layer terminal device; and
wherein the lower-layer terminal device is configured to receive the first processed result through the Sidelink connection;
wherein the lower-layer terminal device is configured to send report information to the terminal, the report information is configured to indicate that the lower-layer terminal device has an independent communication capability;
wherein the terminal is configured to receive the report information; and send a connection instruction to the lower-layer terminal device in response that the first edge computing processor cannot process the data processing request, in which the connection instruction is configured to instruct the lower-layer terminal device to establish an independent communication connection with an access network device, so that the access network device receives the data processing request.

2. The system of claim 1, wherein the system further comprises the access network device:
the access network device is provided with a second edge computing processor, the second edge computing processor is configured to implement an edge computing function of the access network device; and
wherein the access network device is configured to receive the data processing request relayed by the terminal through the relay communication technology; process the data processing request through the second edge computing processor to obtain a second processed result; and send the second processed result to the terminal.

3. The system of claim 2, wherein the terminal is configured to receive and compare the second processed result with the first processed result; and send the first processed result to the lower-layer terminal device through the Sidelink connection in response to the second processed result being consistent with the first processed result.

4. The system of claim 2, wherein the access network device is configured to send scheduling information to the terminal, the scheduling information configures a sending format of the data processing request;
wherein the terminal is configured to send a configuration signaling to the lower-layer terminal device through the Sidelink connection based on the scheduling information, the configuration signaling comprises an information field configured to indicate the sending format of the data processing request;
wherein the lower-layer terminal device is configured to receive the configuration signaling sent by the terminal through the Sidelink connection; and
wherein the configuration signaling comprises at least one of a radio resource control (RRC) signaling, a medium access control-control unit (MAC CE) signaling or a physical layer signaling.

5. A method for processing data, performed by a terminal, wherein the terminal is provided with a first edge computing processor, the first edge computing processor is configured to implement an edge computing function of the terminal, the terminal supports a 5G-based relay communication technology from the terminal to the network and 5G communication connection, and the method comprises:
receiving a data processing request sent by a lower-layer terminal device through a Sidelink connection;
processing the data processing request by the first edge computing processor to obtain a first processed result; and
sending the first processed result to the lower-layer terminal device through the Sidelink connection;
wherein the method further comprises:
receiving report information sent by the lower-layer terminal device, wherein the report information is configured to indicate that the lower-layer terminal device has an independent communication capability;

in response that the first edge computing processor cannot process the data processing request, sending a connection instruction to the lower-layer terminal device, wherein the connection instruction is configured to instruct the lower-layer terminal device to establish an independent communication connection with an access network device, so that the access network device receives the data processing request.

6. The method of claim 5, wherein the method further comprises:
relaying the data processing request to the access network device through a relay communication technology; and
receiving a second processed result from the access network device, wherein the second processed result is obtained by the access network device through a second edge computing processor, the second edge computing processor is configured to implement an edge computing function of the access network device.

7. The method of claim 6, wherein the method further comprises:
receiving and comparing the second processed result with the first processed result; and
sending the first processed result to the lower-layer terminal device through the Sidelink connection in response to the second processed result being consistent with the first processed result.

8. The method of claim 6, wherein the method further comprises:
receiving scheduling information sent by the access network device, wherein the scheduling information is configured to configure a sending format of the data processing request;
sending a configuration signaling to the lower-layer terminal device through the Sidelink connection based on the scheduling information, wherein the configuration signaling comprises an information field configured to indicate a sending format of the data processing request;
wherein the configuration signaling comprises at least one of a radio resource control (RRC) signaling, a medium access control-control unit (MAC CE) signaling or a physical layer signaling.

9. A computer device comprising a processor and a memory, the memory being stored with at least one instruction, at least one program, a set of codes or a set of instructions, which are loaded and executed by the processor to implement the method for processing data as claimed in claim 5.

10. A non-transitory computer-readable storage medium being stored with at least one instruction, at least one program, a set of codes or a set of instructions, which are loaded and executed by a processor to implement the method for processing data as claimed in claim 5.

11. A method for processing data, performed by a lower-layer terminal device, wherein a Sidelink connection is established between the lower-layer terminal device and a terminal, the lower-layer terminal device supports 5G communication connection, and the method comprises:
sending a data processing request to the terminal through the Sidelink connection; and
receiving a first processed result sent by the terminal through the Sidelink connection, wherein the first processed result is obtained by the terminal through a first edge computing processor, the first edge computing processor is configured to implement an edge computing function of the terminal;
wherein the method further comprises:
sending report information to the terminal, wherein the report information is configured to indicate that the lower-layer terminal device has an independent communication capability; and
receiving a connection instruction sent by the terminal through the Sidelink connection, and establishing an independent communication connection with an access network device based on the connection instruction, so that the access network device receives the data processing request.

12. The method of claim 11, wherein the method further comprises:
receiving a second processed result through the Sidelink connection, wherein the second processed result is obtained by the access network device through a second edge computing processor after the terminal relays the data processing request to the access network device.

13. The method of claim 12, wherein the method further comprises:
receiving a configuration signaling sent by the terminal, wherein the configuration signaling comprises an information field configured to indicate a sending format of the data processing request and is sent to the lower-layer terminal device after the terminal receives the scheduling information sent by the access network device;
wherein the configuration signaling comprises at least one of a radio resource control (RRC) signaling, a medium access control-control unit (MAC CE) signaling or a physical layer signaling.

* * * * *